Patented Nov. 12, 1929

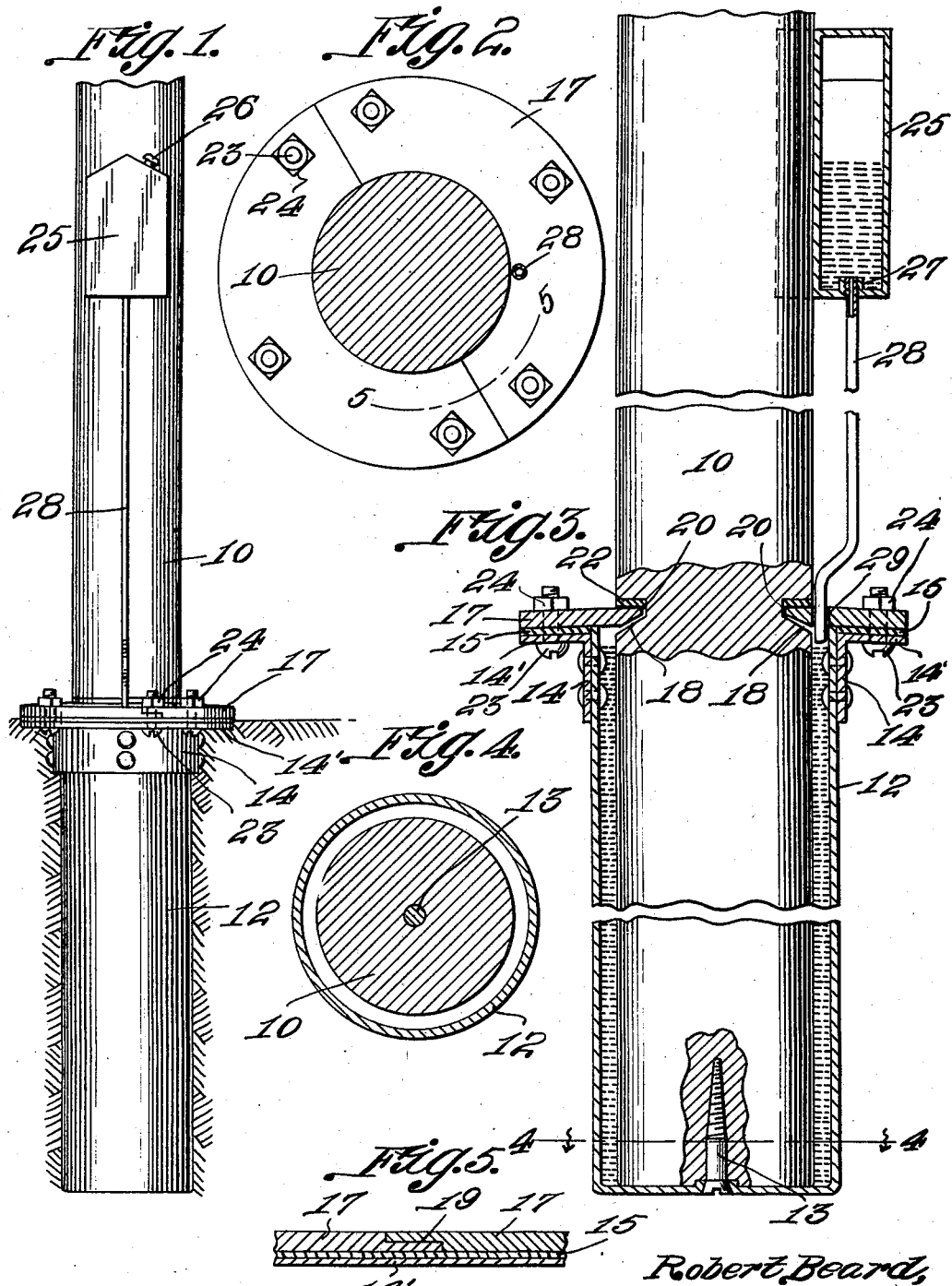

1,735,722

UNITED STATES PATENT OFFICE

ROBERT BEARD, OF PHILADELPHIA, PENNSYLVANIA

POLE-PROTECTING DEVICE

Application filed June 28, 1926. Serial No. 119,185.

The object of this invention is to provide for the protection of a telegraph pole, or other form of wooden pole, which is frequently set in direct contact with the earth, and which under those conditions, is subject to rapid deterioration.

A further object is to provide a device which will prevent water from passing down the sides of the pole and into a concrete or other form of reinforcement or boot which is sometimes provided, and which leaves an opening for the admission of water when the pole shrinks, the wood also being then exposed to the attacks of insects, at a point where they will produce extensive damage.

A further object is to provide special means for supplying a preservative to a casing surrounding the base of the pole, the casing having its upper end sealed to prevent the admission of water.

A further object is to provide a special form of sealing device.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 1 shows the device in elevation, and in operative position.

Figure 2 is a top plan view of the device, or more especially of the collar constituting the sealing element, the pole appearing in horizontal section.

Figure 3 is a view of the device in vertical section, the pole being chiefly in elevation, with a portion broken away.

Figure 4 is a section on line 4—4 of Figure 3.

Figure 5 is a section on line 5—5 of Figure 2.

The pole is designated 10, and the casing or main portion of the boot is designated 12, and is secured to the bottom of the pole in any suitable manner, as by the use of a screw 13, passing thru the bottom of casing 12.

A collar or sleeve 14 is riveted to the upper end of casing 12, and includes a flange 14' extending horizontally and serving to mount a gasket 15. An important feature of the construction is the flat collar 17 having a central opening, and the edge portion of the collar adjacent to the opening being bevelled as shown at 18.

The collar 17 is of the two-part variety, as shown in Figure 2, and the elements overlap as shown in Figure 5, the abutting edges or meeting edges of the elements of the collar being cut away as indicated at 19.

The pole 10 is provided with an annular groove 20, and the two-part collar 17 is applied to the gasket 15, the inner edge of the collar projecting into the annular groove 20 and contacting with the gasket 22.

The collar 17 is secured by screws or bolts 23 retained by nuts 24, any suitable number being provided, and the special purpose of this construction, as already intimated, is to effect water-tight connection, so that rain passing down the sides of the pole, or water accumulating from other sources, cannot enter the casing 12.

In order to introduce a preservative into the annular chamber provided between the outer surface of the pole and the inner wall of casing 12, I make use of a tank 25 which may include curved walls or at least one curved wall, and which is attached to the side of the pole in any suitable manner. The tank is provided with a filling connection 26 and with an outlet connection as shown at 27, the latter being in communication with tube 28 passing thru opening 29 in the collar 17. The annular space between the pole and casing 12 is sufficient to provide for variation in the diameter of the pole, and a suitable preservative, such as creosote, is placed in the tank, and is allowed to flow to the casing 12 for thoroughly impregnating the wood, it being understood that applications may be made in this manner at intervals, and as frequently as required.

Having thus described the invention, what I claim is:

In a metallic pole boot and joint of the class described, a casing for receiving a pole, and having greater diameter than the pole, said pole having an annular groove therein, a flanged element secured to the top of the casing, and a collar mounted on said flanged element, said collar being proportioned to enter the annular groove, said flanged element constituting a sleeve extending downwardly around the upper portion of the casing and reinforcing the latter, and the flange of the sleeve and the collar which enters the groove of the pole reinforcing each other.

In testimony whereof I affix my signature.
ROBERT BEARD.